United States Patent [19]

Noguchi et al.

[11] Patent Number: 5,597,614

[45] Date of Patent: Jan. 28, 1997

[54] ULTRAFINE PARTICLE DISPERSED GLASSY MATERIAL AND METHOD

[75] Inventors: Toru Noguchi, Hyogo; Kazuo Goto, Amagasaki; Sigehiko Hayashi, Hyogo; Masahito Kawahara, Osaka; Susumu Murakami, Kobe; Yoshio Yamaguchi; Shigehito Deki, both of Hyogo, all of Japan

[73] Assignee: Mitsuboshi Belting Ltd., Kobe, Japan

[21] Appl. No.: 466,229

[22] Filed: Jun. 7, 1995

Related U.S. Application Data

[62] Division of Ser. No. 109,223, Aug. 19, 1993.

[30] Foreign Application Priority Data

| Aug. 20, 1992 | [JP] | Japan | 4-245739 |
| Sep. 24, 1992 | [JP] | Japan | 4-280480 |
| Oct. 22, 1992 | [JP] | Japan | 4-309266 |

[51] Int. Cl.[6] ........................................... B05D 5/06
[52] U.S. Cl. ..................... 427/162; 427/163.2; 427/226; 427/377; 427/385.6379
[58] Field of Search .................. 427/226, 385.5, 427/229, 377, 162, 379, 163.2

[56] References Cited

U.S. PATENT DOCUMENTS

| 2,148,453 | 2/1939 | Fruth | 427/226 |
| 2,947,646 | 8/1960 | Devaney et al. | 106/193 |
| 3,083,109 | 3/1963 | Devaney et al. | 106/193 |
| 3,619,287 | 11/1971 | Stankavich | 427/226 |
| 3,663,276 | 5/1972 | Alliington et al. | 427/226 |
| 3,784,407 | 1/1974 | Shioo et al. | 427/226 |
| 4,025,665 | 5/1977 | Hannon | 427/192 |
| 4,328,299 | 5/1982 | Beall et al. | 430/13 |
| 4,457,973 | 7/1984 | Matsui et al. | 428/372 |
| 4,615,903 | 10/1986 | Miller | 427/26 |
| 4,654,229 | 3/1987 | Morita et al. | 427/180 |
| 4,714,631 | 12/1987 | Aufderheide | 427/250 |
| 4,720,401 | 1/1988 | Ho et al. | 427/250 |
| 4,842,832 | 6/1989 | Inoue et al. | 423/211 |
| 4,889,746 | 12/1989 | Utsumi et al. | 427/162 |
| 4,913,845 | 4/1990 | Gillberg–LaForce et al. | 252/582 |
| 4,983,456 | 1/1991 | Iwaskow et al. | 428/254 |
| 5,045,402 | 9/1991 | Adams, Jr. et al. | 428/545 |
| 5,093,286 | 3/1992 | Nogami et al. | 501/17 |
| 5,110,505 | 5/1992 | Herron et al. | 252/518 |
| 5,231,533 | 7/1993 | Gonokami et al. | 359/328 |
| 5,279,868 | 1/1994 | Ohtsuka et al. | 427/586 |
| 5,296,189 | 3/1994 | Kang et al. | 419/9 |
| 5,354,578 | 10/1994 | Beyer et al. | 427/226 |

FOREIGN PATENT DOCUMENTS

| 0125617 | 11/1984 | European Pat. Off. . |
| 0318196 | 5/1989 | European Pat. Off. . |
| 0495459A1 | 1/1992 | European Pat. Off. . |
| 4133370A1 | 4/1993 | Germany . |
| 55144029 | 10/1980 | Japan . |
| 1024832 | 1/1989 | Japan . |
| 314781 | 7/1969 | U.S.S.R. . |
| WO90/11890 | 10/1990 | WIPO . |
| WO92/16571 | 10/1992 | WIPO . |

OTHER PUBLICATIONS

Toru Noguchi et al, Novel Method To Disperse Ultrafine Metal Particles Into Polymer, Journal of Materials Science Letters 10 (1991), pp. 477–479 (no Month).

K. Kashiwagi et al, Organic Films Containing Metal Prepared by Plasma Polymerization, J. Vac. Sci. Technol. A 5(4), Jul./Aug. 1987, (3 pages).

Noguchi et al.; "New Technique to Produce Au/$Mo_x$ (M=Ti or Al) Glass Composite Containing Au Microcrystals at High Concentration"; *Applied Physics Letters*, No. 15 (Apr. 1993).

*Primary Examiner*—Janyce Bell
*Attorney, Agent, or Firm*—Wood, Phillips, VanSanten, Clark & Mortimer

[57] ABSTRACT

A particle dispersed glassy material includes ultrafine metal particles that are present in a high concentration. The particles are surrounded by a fixation component and, optionally, can be surrounded by a skeleton forming component. The glassy material is produced by firing a substrate having a film thereon that includes a polymer composite having the ultrafine particles uniformly dispersed therein, a fixation reagent and, optionally, a skeleton forming reagent under relatively mild conditions that do not damage the substrate. A method of making the glassy material includes the steps of making a film-forming composition that includes the polymer composite, the fixation reagent and, optionally, the skeleton forming reagent, applying the composition to a substrate, drying the applied composition to produce a film and firing the film to produce the glassy material.

7 Claims, 5 Drawing Sheets

ULTRAFINE PARTICLE DISPERSED GLASSY MATERIAL AND METHOD

This is a division of application Ser. No. 08/109,223 filed Aug. 19, 1993.

FIELD OF THE INVENTION

This invention generally relates to ultrafine particle dispersed glassy materials and a method of manufacturing the same. More particularly, the invention relates to glassy materials having ultrafine particles of metal or metal oxide, a fixation component and, optionally, a skeleton forming component. The glassy material can be used in optical and electronic components including optical devices such as wavelength transfer filter from infrared to visible light, infrared transmitting filter glasses utilizing non-linear optical effects, photo responsible material such as an optical switching device which acts by absorbing selected wavelength of light, color glasses and color producing agents for glass.

BACKGROUND OF THE INVENTION

It is well known that when particles of a metal become smaller than about 100 nanometers (nm) their characteristics, e.g., electronic structure, lattice specific heat, spin magnetic susceptibility and the like, become quite different from those of the bulk metal. Metal particles can be used in colored glasses and glass filters prepared by dispersing ultrafine particles of gold, silver or a semiconductor, e.g., $CdS_xSe_{1-x}$, in glass. These colored glass filters are known to have non-linear optical characteristics and can be used in optical switches and electronic devices for optical computers. The non-linear optical characteristics are attributed to the increase in third order non-linear optical characteristics caused by the band filling effect or the exciton confinement effect, which in turn is caused by the discreetness of energy bands due to the quantum confinement effect.

The glass having the particles dispersed therein can be made by a number of known methods. The sol-gel process includes the steps of adding colloidal metallic particles to a silica sol prepared by hydrolysis of a silicon alkoxide, dispersing the metallic particles, pouting the dispersion into a vessel, allowing it to gel, drying the gel and sintering the dried gel. The sol-gel process not only takes a very long time to produce the glass but difficulties are encountered in preventing colloidal metallic particles from aggregating. Also, this process has a serious disadvantage in that a high particle concentration cannot be achieved.

An alternative process is a sol-gel-combustion process that includes the steps of dispersing fine particles of a semi-conductor, e.g., silicon, in a sol prepared from alkoxide, drying the sol, permitting the sol to gel, sintering the gel and mixing the so-obtained semi-conductor fine particles (coated with an oxide glass) with fine glass particles formed by burning gaseous hydrogen and oxygen in the presence of a raw material for glass, e.g., $SiCl_4$, $GeCl_4$ and $PCl_3$, with the gasses being continuously supplied, and then firing the mixture. The sol-gel-combustion process has difficulties in obtaining a high concentration of fine metallic particles.

Other alternative processes are the precipitation process and the sputtering process. In the precipitation process, the fine particles are precipitated in glass by maintaining a molten glass containing, e.g., CdSe, at a temperature not higher than its flowing temperature and not lower than its yielding temperature. The sputtering process includes the steps of preparing a composite glass by sintering a mixture of a low melting glass powder and a powder containing at least one of a cadmium source, sulfur source, selenium source or tellurium source, and then forming a fine particle dispersed glass by means of sputtering using the composite glass as the target. It is difficult to control the size of the fine metallic particles and to obtain a high concentration of fine metallic particles using either the deposition process or the sputtering process.

The ion implantation method implants metallic ions in a glass base by causing the ions to impact the glass base at a high speed and then heat treating to control the particle size. Large equipment that is unsuitable for mass production is required to use the ion implantation method. Furthermore, a high particle concentration cannot be achieved.

The materials used in these conventional methods are low in third order non-linear susceptibility [$\chi(3)$] because of their low fine metal particle concentration. Increasing the fine metal particle concentration increases the third order non-linear susceptibility.

Materials having a large third order non-linear susceptibility can make optically bi-stable responses to a relatively small incident light intensity and enable not only high-density electronic component mounting but also rapid switching responses. Therefore, it is desirable to obtain a high fine metal particle concentration and have a large third order non-linear susceptibility.

A confined exciton is presently theorized to impart the non-linear characteristics to ultrafine particles of a semiconductor material. The radius of the confined exciton is about 3 to about 4 times the semi-conducting material's Bohr radius. A well studied material is CdS-CdSe and its ultrafine particles are several tens of nanometers in size. In spite of the advantages of this material in ultrafine particle form, its Bohr radius is several nanometers which results in a limited number of confined excitons.

To make full use of the advantages of an ultrafine particle by obtaining many more confined excitons, a semi-conductor material having a smaller Bohr radius is desired. Two semi-conductor materials that have been studied are CuBr (having a Bohr radius of about 1.25 nm) and CuCl (having a Bohr radius of about 0.7 nm). Another semi-conductor material is $Cu_2O$ (having a Bohr radius of 0.7 nm). Unfortunately, the copper is liable to undergo a reaction in the glass to form CuO, $Cu^{++}$, $Cu^+$ or Cu. It is conventionally impossible to obtain a glassy material that contains separated ultrafine $Cu_2O$ particles dispersed therein at high concentrations.

A glassy material having a high ultrafine particle concentration, a large third order non-linear susceptibility and that uses particles having a small Bohr radius and which does not exhibit the above-described shortcomings is highly desirable. A method of making the glassy material that does not exhibit the shortcomings of the above-described methods is also desirable.

SUMMARY OF THE INVENTION

The invention is directed to an ultrafine particle dispersed glassy material that includes ultrafine particles and a fixation component. The particles can be made of a noble metal, e.g., gold, platinum, palladium, rhodium and silver, $Cu_2O$, a metal selected from the group of titanium, vanadium, chromium, manganese, iron, nickel, copper, zinc, cadmium, yttrium, tungsten, tin, germanium, indium and gallium or their oxides. The fixation component has the formula:

$MO_x$ wherein M is either an amphoteric element or a metallic element. Representative amphoteric elements include aluminum, germanium, tin, antimony, gallium, lead, chromium and manganese. Representative metal elements include titanium, iron, copper, niobium, tantalum, cadmium and indium. The range of x is about 0.1 to about 3. An optional skeleton forming component having the formula:

$M'O_y$ wherein M' is silicon, boron or phosphorous and y is in the range of about 0.1 to about 3 can be utilized.

The invention is also directed to a method of making the glassy material by dissolving a polymer composite and an organometallic compound as a fixation reagent in an organic solvent to produce a film-forming composition. The polymer composite includes a polymer having the ultrafine particles dispersed therein. The film-forming composition is applied to a surface of a substrate and dried to produce a film. The film can then be sintered to produce the glassy material.

The polymer composite can be produced by forming a thermodynamically unstable polymer layer having a surface, depositing a metal layer on the surface of polymer and stabilizing the unstable polymer layer having the metal layer.

The glassy material has the ultrafine particles uniformly distributed therethrough. A high concentration of ultrafine particles can be achieved to obtain a large third order non-linear susceptibility. The particles have a small Bohr radius that results in many confined excitons that are theorized to impart the large third order non-linear susceptibility.

Numerous other advantages and features of the present invention will become readily apparent from the following detailed description of the preferred embodiments, the drawings and the appended claims.

BRIEF DESCRIPTION OF THE DRAWINGS

FIG. 1 is a longitudinal cross-sectional view of a polymer layer formed on a substrate;

FIG. 2 is a longitudinal cross-sectional view of a metal layer on the polymer layer;

FIG. 3 is a longitudinal cross-sectional view of the polymer layer, ultrafine particles in the polymer layer and the film during heating;

FIG. 4 is a longitudinal cross-sectional view of the polymer composite on the inventive material obtained by a method in accordance with this invention;

DETAILED DESCRIPTION OF THE PREFERRED EMBODIMENTS

Figure 1:
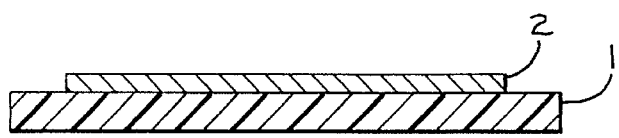
FIGS. 1, 2, 3 and 4 are schematical representations of a method of making a polymer composite that is used in the inventive material.
Figure 2:
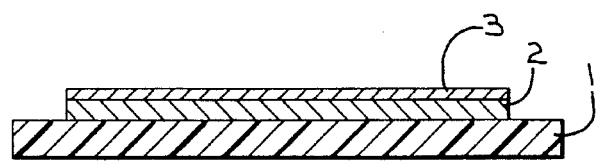
Figure 3:
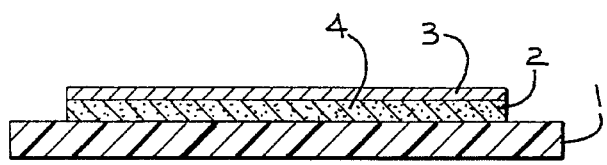
Figure 4:
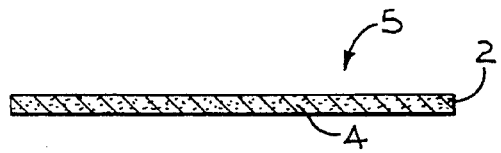

An ultrafine particle dispersed glass material, according to the invention, includes ultrafine particles and a fixation component. The ultrafine particles can be particles of a noble metal such as gold, platinum, palladium, rhodium and silver, $Cu_2O$, a metal selected from the group of titanium, vanadium, chromium, manganese, iron, nickel, copper, zinc, cadmium, yttrium, tungsten, tin, germanium, indium and gallium, or their oxides. The fixation component has the formula:

$MO_x$ wherein M is (i) an amphoteric element such as aluminum, germanium, tin, antimony, gallium, lead, chromium and manganese or (ii) a metallic element such as titanium, iron, copper, niobium, tantalum, cadmium and indium and x is in the range of about 0.1 to about 3. The size of the ultrafine particles is less than about 100 nanometers (nm) and preferably is in the range of about 1 to about 50 nm. The particles are present in an amount in the range of about 1 to about 90 mol %. The fixation component is produced from a fixation reagent. The fixation component is a glassy component of the glassy material and is a non-crystalline inorganic material that substantially surrounds the particles.

Optionally, the glassy material can further include a skeleton forming component having the formula:

$M'O_y$ wherein M' is silicon, boron or phosphorous and y is in the range of about 0.1 to about 3 that is produced by a skeleton forming reagent. The skeleton forming component is also a glassy component and is a non-crystalline inorganic material that substantially surrounds the particles.

The ultrafine particle dispersed glassy material can be produced by mixing a polymer composite, a fixation reagent and, optionally, a skeleton forming reagent in an organic solvent to produce a film-forming composition, applying the film-forming composition to a surface of a substrate and drying the applied composition to produce a film. The film can then be sintered to produce the glassy material.

The polymer composite is prepared with the ultrafine particles being finely divided therein with substantially no aggregation. A method of producing the polymer composite includes the steps of forming a thermodynamically unstable polymer layer having a surface, depositing a metal layer on the surface and stabilizing the unstable polymer layer to draw particles from the metal layer into the polymer layer. Stabilization to an equilibrium condition can be achieved by heating the unstable polymer layer having the metal layer thereon at a temperature less than the melting temperature of the polymer. Alternatively, the polymer layer can be permitted to achieve stable state with the lapse of time.

As shown in FIGS. 1 to 4, the thermodynamically unstable polymer layer 2 is on a substrate 1. The unstable polymer layer 2 has the metal layer 3 on a surface opposed to the surface adhered to the substrate 1. As the polymer layer 2 is stabilized, the metal layer 3 becomes fine particles 4 that diffuse and penetrate into the polymer layer 2. The diffusion and penetration continue until the polymer layer 2 is in a stable state. The thickness of the metal layer 3 is reduced as diffusion and penetration continues and the metal layer 3, preferably, finally disappears. A polymer composite 5 is produced that has the particles 4 separated and dispersed in the polymer layer 2. The polymer composite 5 is then removed from the substrate.

The thermodynamically unstable polymer layer can be produced by a vacuum deposition process, a melt and quench process, a rapid disolvating method or a freeze drying method. In the vacuum deposition process, the polymer layer is formed on the substrate, e.g., a glass plate, by performing conventional vacuum deposition at a reduced pressure of about $1\times10^{-4}$ to about $1\times10^{-6}$ Torr at a deposition rate of about 0.1 to about 100, preferably about 0.5 to about 5, microns per minute (μm/min). In the melt and quench process, the polymer is melted, applied to the substrate and then rapidly quenched at a rate higher than the critical cooling rate intrinsic to the polymer. Quenching can be obtained by immersing the molten polymer into liquid nitrogen or the like. In the rapid disolvating method, the polymer is dissolved in a solvent to produce a polymer solution, the polymer solution is applied to the substrate and the solvent is rapidly removed. The concentration of the polymer in the polymer solution is preferably not more than about 60 weight (wt %) and is more preferably not more than about 20 wt %. The solvent can be removed by placing the substrate having the applied polymer solution thereon in a closed vessel that is maintained at a constant temperature and evacuated at a high rate that is preferably not less than about 240 liters per minute. In the freeze drying method, the solvent is removed from the polymer solution at a low temperature and at a high rate of evacuation. The temperature preferably is less than about 20° C. and most preferably is less than about 0° C. In the rapid disolvating method and the freeze drying method, the polymer exhibits a tendency to return to a stable state as the amount of solvent in the polymer solution decreases. However, when a high enough rate of evaporation is utilized, it is effective to prevent the polymer from returning to a stable state and to produce a thermodynamically unstable state.

Representative polymers preferably have a molecular cohesive energy greater than about 2000 calories per mole and can be crystalline or non-crystalline. Suitable polymers include nylon 6, nylon 66, nylon 11, nylon 12, nylon 69, polyethylene terephthalates (PET), polyvinyl alcohols, polyphenylene sulfides (PPS), polystyrenes (PS), polycarbonates, polymethylmethacrylates and the like.

The term "molecular cohesive energy", as used in its various grammatical forms, is defined in Kagaku Binran, Ohyo Hen (Chemical Handbook, Applications), edited by The Chemical Society of Japan (1974).

The metal layer is formed by applying metal to the surface of the polymer layer by vacuum deposition of metal or by laminating the metal film to the surface. The metal film can be a metal foil or a metal plate. Preferably, the thickness of the metal layer is such that when the unstable polymer layer is stabilized the entire thickness of the metal layer is consumed. Vacuum deposition can be performed using the above-described conditions.

The unstable polymer layer having the metal layer thereon is then stabilized by heating to a temperature greater than the glass transition temperature of the polymer and less than the melting temperature of the polymer. During transformation to the stable state, the metal of the metal layer diffuses into the polymer layer to form ultrafine particles that are less than about 100 nm in size with a maximum particle size distribution in the range of about 1 to about 10 nm. Diffusion continues until the polymer layer is completely saturated and the metal layer is consumed and finally disappears. The ultra fine particles are distributed uniformly in the stabilized polymer layer without aggregation.

Alternatively, stabilization can be achieved at ambient conditions.

Alternatively, the polymer composite can be made by producing ultrafine particles by a vapor phase process (which is a melt-vaporizing process), a liquid phase process (which is a precipitation process), a solid phase process or a dispersion process. The particles are then mechanically mixed with a polymer solution or molten polymer. The polymer solution having particles mixed therein is then subjected to rapid removal of the solvent as described above in the discussion of the disolvating and freeze drying methods. The molten polymer having particles mixed therein can be rapidly quenched in accordance with the procedure disclosed in the melting and quenching method.

Representative of the fixation reagent is organometallic compounds such as metallic acid esters, organic metal complexes and organic acid metallic salts. Representative metallic acid esters have the formula:

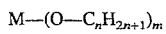

wherein M can be titanium, aluminum, antimony, germanium, tantalum, tin, niobium and the like and n and m are alike or different and are in the range of 1 to about 5. Examples of the metallic acid ester include tetraethoxy titanium, triethoxy aluminum, triethoxy antimony, tetraethoxy germanium, tetraethoxy tantalum, diethoxy tin, tetra-i-propoxy titanium, tri-i-propoxy aluminum, tri-i-butoxy aluminum, penta-n-butoxy tantalum, tenta-n-butoxy niobium, tenta-n-butoxy germanium and tetra-i-amynoxy tin.

Examples of the organic metal complex include ethylacetoacetate aluminum di-i-propylate, aluminum tris (acetylacetate), aluminum oxine complexes and the like.

Suitable organic acid metallic salts include aluminum benzoate, iron naphthenate, iron octanate, copper octanate and the like.

The skeleton forming reagent increases the strength and raises the chemical durability of a film formed by drying the film forming composition to remove the solvent. The inorganic material can form a glassy skeleton.

Representative skeleton forming reagents include tetra-i-propoxysilane, triethyl borate, tristearyl borate, triphenyl borate, tricresyl phosphate, triphenyl phosphate, iproniazid phosphate, diphenyl phosphate, phosphonoacetic acid, phosphoramidon, di-n-butyl phosphate, triethyl phosphate, tri-n-amyl phosphate and the like.

The polymer composite is dissolved in an organic solvent to produce a paste having uniformly dispersed ultrafine particles. The particles are so small that they interact with the polymer so that particles do not separate from the polymer and precipitation and aggregation of the particles is avoided. Preferably, the ultrafine particles are present in the paste in an amount in the range of about 0.01 to about 80 wt %.

Representative organic solvents include m-cresol, dimethylformamide, cyclohexane, formic acid and the like.

Next, an fixation reagent is mixed with the ultrafine particle dispersed paste to produce the film-forming composition. The fixation reagent can be first dissolved in the organic solvent prior to mixing with the paste. Alternatively, the polymer composite and the fixation reagent can be simultaneously dissolved in the organic solvent.

Optionally, the film-forming composition including the polymer composite and the fixation reagent can be admixed with the skeleton forming reagent. The skeleton forming reagent can be dissolved in an organic solvent prior to admixing with the composition or can be simultaneously dissolved in the organic solvent with the polymer composite and the fixation reagent.

The skeleton forming reagent is present in the film-forming composition in an amount in the range of about 0.1 to about 90 mol %.

The film-forming composition is then coated on a substrate, e.g., a glass plate, dried to remove the solvent and produce a film that is fired at an elevated temperature for a time period effective to decompose and remove the organic component, e.g., nylons and alkoxides. Drying can be accomplished at an elevated temperature of about 60° C. to about 200° C. for a time period of about 10 minutes. Alternatively, drying can be accomplished by evacuation at a high rate as disclosed in the disolvating and freeze drying methods. Firing can be accomplished at a temperature in the range of about 300° to about 800° C. Since the firing conditions are relatively mild, the substrate is not damaged which permits low priced substrates such as soda-lime glass to be used. The firing temperature is at least the decomposition temperature of the polymer. Firing is performed in an atmosphere that produces the glassy oxide around the fixed particles.

When the particles are $Cu_2O$ particles, firing can be accomplished by one of the following three methods. The first method is to fire the substrate having the film thereon for a time period in a weak oxidizing atmosphere. That is, firing is performed in an atmosphere including an inert gas such as nitrogen, carbon dioxide or argon and about 0.1 to about 1.0 volume percent (vol %) oxygen at a temperature not less than about 300° C. In this method, ultrafine particles of $Cu_2O$ are fixed in a glass matrix using a single firing step.

The second method includes the steps of heating the substrate having the film thereon in an atmosphere including the inert gas and less than about 1 vol % oxygen at a temperature not less than about 300° C. to fix the fine copper particles in the fired film, treating in an oxidizing atmosphere at a temperature in the range of about 100° C. to about 300° C. to oxidize the fine copper particles to produce fine $Cu_2O$ particles. Alternatively, the fixed fine copper particles can be produced at a reduced pressure at a temperature not less than about 300° C. and then treated in the oxidizing atmosphere The third method includes the steps of firing the substrate having the $Cu_2O$-containing film thereon in an atmosphere including the inert gas and at least about 1 vol % oxygen, or in a room atmosphere, at a temperature not less than about 300° C. in order to decompose and remove organic components, oxidizing the fine $Cu_2O$ particles into fine CuO particles to fix them in the glass matrix and then subjecting the same to heat treatment at a temperature in the range of about 100° C. to about 300° C. in a mixed gas including the inert gas and at least 0.1 vol % hydrogen, methane or carbon dioxide as a reducing gas to reduce the fine CuO particles to fine $Cu_2O$ particles.

The ultrafine particles interact with the fixation component which prevents the particles from aggregating and permits them to be fixed in the glassy material without increasing their size. The concentration of ultrafine particles in the glassy material can be high which produces a glassy material having excellent non-linear optical characteristics. The fixation component interacts with, and substantially surrounds, the particles which inhibits the fixation component from crystallizing. Thus, a non-crystalline glassy component is produced which, together with the particles, is a major component of the particle dispersed glassy material and which permits light to pass at a high level of transmittance. The film is fired under atmospheric conditions of either oxidation or deoxidation to control the oxidative condition of the fine particles. The relatively low firing temperatures do not adversely affect the substrate.

The tests used to evaluate the particle dispersed glassy materials will now be described.

1. Chemical State of Ultrafine Particles in the Glassy Materials

The chemical state of the ultrafine particles in the glassy material was determined by x-ray diffraction because the particles are a crystalline substance. Measurements were made on an x-ray diffractometer model RINT 1200 (made by Rigaku) which was equipped with a thin film attachment. The metal or metal oxide particles were tested according to the 2Θ method at a fixed incidence angle of 1 ° to obtain a x-ray diffraction pattern to identify the chemical state of the particles.

2. Amount of Ultrafine Particles and Glassy Component in the Glassy Material

These were calculated in mole percent from the amounts of respective raw materials contained in the film-forming composition. It was assumed that the organic components were thoroughly decomposed and removed and that the inorganic component did not vaporize or disappear during the sintering step.

3. Particle Size

The size of the crystalline particles was calculated using the Scherrer's equation from a half breadth value of the main peak of the x-ray diffraction pattern of the glassy material obtained as described above in 1.

4. Structure of the Glassy Component of the Glassy Material

The x-ray diffraction pattern of the glassy material obtained above in 1 was used to determine whether or not any diffraction peak other than that for the particles was present. A glassy material having no other diffraction peak, or one giving a broad halo, was judged to have a glassy component having a non-crystalline structure.

5. Chemical State of Glassy Component of the Glassy Material

The chemical state of the glassy material was evaluated by measuring the fluorescent x-ray spectrum. The energy state of the outermost-shell electrons of an element vary slightly depending upon the presence of bonding with another element, the kind of element to which it is bonded, the oxidation state and the like. Accordingly, when a fluorescent x-ray spectrum corresponding to the transition of the outermost-shell electrons of elements of a glassy component, e.g., titanium and aluminum, is measured, the peak shifts its position depending on the chemical state of the element. That is, changes in energy state or the appearance of a new satellite peak is observed. Thus, the chemical state of the element can be determined.

The equipment used was a fluorescent x-ray spectrometer model 3270 made by Rigaku. The oxidation state of aluminum was examined using the fine slit system and a spectroscopic PET crystal, by integrating the intensity for four seconds for each sampling of +e,fra 200+ee th of a degree within the sampling angle of 129° to 136°, to measure the aluminum-K β1 high resolution spectrum.

6. Optical Characteristics

The light absorption spectrum of a glassy material formed on a soda-lime glass substrate was examined with a UVIDEC-650 spectrophotometer made by Nippon Bunkoh Kogyo Co.

7. Electric Properties

Figure 7:
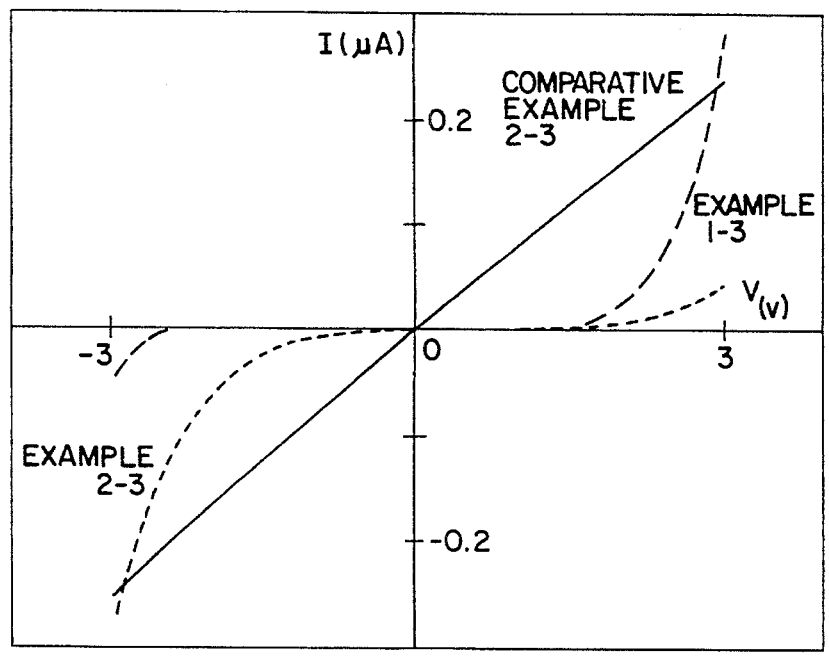
FIG. 7 shows I-V electric characteristics of samples made according to the EXAMPLES and COMPARATIVE EXAMPLES.
Figure 8:
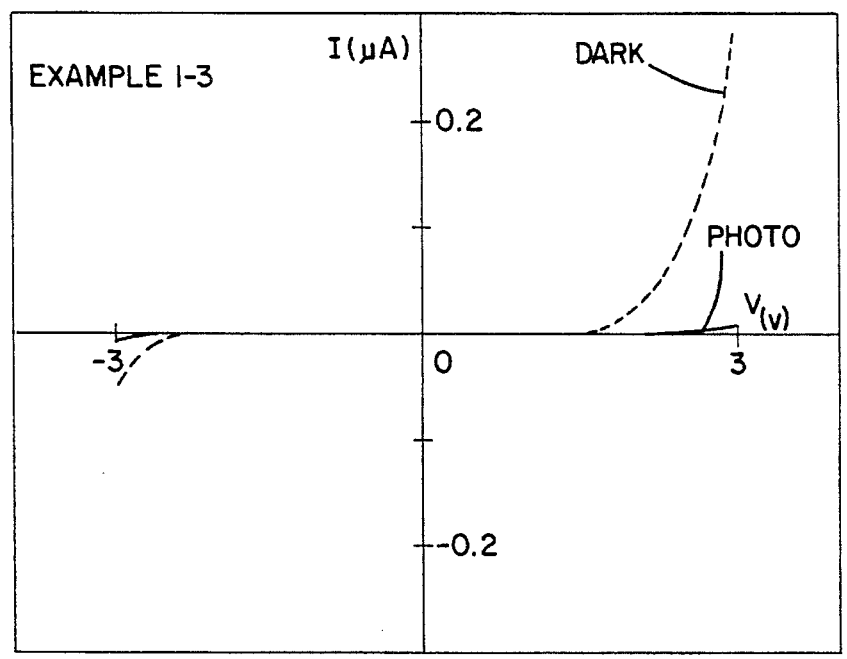
FIG. 8 shows I-V electric characteristics of samples made according to the EXAMPLES.
Figure 9:
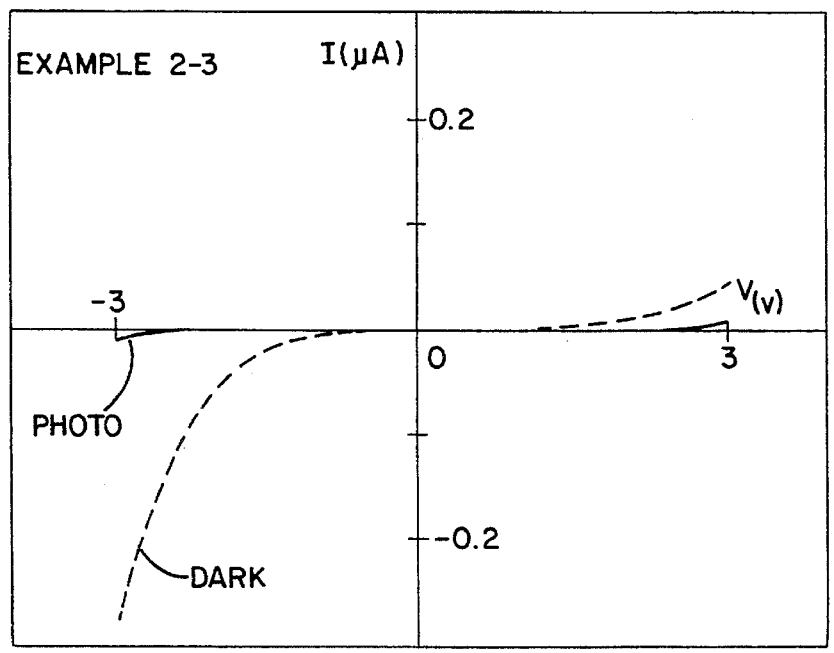
FIG. 9 shows light-responding characteristics of samples made according to the EXAMPLES.

A particle dispersed glassy material or a comparative material layer having a thickness of about 20 microns was formed on an ITO glass (a transparent conductive glass) substrate which formed the electrode. The glassy material layer was then vacuum metallized with gold to produce the gold electrode. Then, an aluminum foil was attached as a lead to the ITO glass substrate and another aluminum foil was attached to the gold layer using a silver paste so that a sample for measuring electric characteristics was prepared. The current (I) and the voltage (V) electric characteristics of the sample were determined by applying a voltage in the range of +3 to −3 volts across the two electrodes using a potentiostat at a sweep rate of 100 millivolts per second (mV/sec) and then measuring the current levels. The response of the sample to light was examined by comparing the I-V characteristics measured without light irradiation, i.e., in a dark environment, with the I-V characteristics measured under illumination with a 300 watt (W) xenon lamp, i.e., photo conditions. The results of this test are illustrated in FIGS. 7 to 9.

The following examples are given by way of illustration and not limitation.

EXAMPLE 1

Five grams (g) of nylon 11 pellets were placed on a tungsten board in a vacuum evaporator which was then evacuated to $1 \times 10^{-6}$ Torr. The tungsten board was heated by applying a voltage to melt the nylon 11 while maintaining the vacuum. Nylon 11 was evaporated and deposited on a glass substrate set on the mount in the vacuum evaporator at a rate of about 1 μm/min at a reduced pressure of about $1 \times 10^{-4}$ to about $1 \times 10^{-6}$ Torr. The deposited nylon 11 layer had a thickness of about 5 microns. The molecular weight of the nylon 11 of the deposited layer was about ½ to about 1/10th the molecular weight of nylon 11 of the pellets.

Then, gold chips were placed on the tungsten board, melted and evaporated at a reduced pressure of about $1 \times 10^{-4}$ to about $1 \times 10^{-6}$ Torr to produce a gold layer on the polymer layer. The product was removed from the vacuum evaporator and placed in a thermostatic chamber set at a temperature of about 120° C. for a time period of about 10 minutes to produce the polymer composite. The polymer composite contained about 15 weight percent gold in the form of ultrafine particles having an average size of about 5 nm.

The polymer composite and an fixation reagent, i.e., tetra-i-propoxy titanium [Ti(i—OC$_3$H$_7$)$_3$], were dissolved in m-cresol in the amounts indicated in TABLE 1 with adequate mixing to produce film-forming compositions. TABLE 1 gives the amount of polymer composite, on a weight percent solids basis, present with the balance being the fixation reagent. After coating ITO glass substrates with the film-forming compositions, the samples were placed in a closed vessel and dried at a temperature of 120° C. for a time period of 10 minutes while removing the solvent using reduced pressure induced by a rotary pump. The resulting films on substrates were fired in an oven at a temperature of 500° C. for a time period of about 10 minutes to decompose and remove the organic components, sinter the metal oxide and produce particle dispersed glassy materials. The characteristics of the glassy materials are provided in TABLE 1.

TABLE 1

| | Example 1 | | | | |
|---|---|---|---|---|---|
| | 1-1 | 1-2 | 1-3 | 1-4 | 1-5 |
| polymer composite | | | | | |
| average size of ultrafine-particle (nm) | 5 | 5 | 5 | 5 | 5 |
| content of ultrafine-particle (wt %) | 15 | 15 | 15 | 15 | 15 |
| content of polymer composite (wt %) | 34.4 | 70.3 | 82.5 | 89.7 | 94.5 |
| color before fired film after fired | red | red | red | red | red |
| color | dark blue | dark blue | dark blue | green blue | green blue |
| content of Au (mol %) | 10 | 33 | 50 | 67 | 80 |
| particle size of Au (nm) | 7 | 7 | 8 | 10 | 14 |
| chemical state of Ti | oxide (Ti—O) | oxide (Ti—O) | oxide (Ti—O) | oxide (Ti—O) | oxide (Ti—O) |
| structure of Ti—O | non-cystal | non-cystal | non-cystal | non-cystal | non-cystal |

It can be understood from TABLE 1 that the ultrafine gold particles in the glassy material have about the same size as the ultrafine gold particles in the polymer composite and are fixed in the titanium oxide glassy component as ultrafine particles without changing their form. It can be assumed that sintering changed the color of the glassy material from the red of a gold colloid and that the gold and the titanium oxide interacted with each other. This interaction is presently theorized to prevent the ultrafine particles from aggregating with each other and growing in size. The ultrafine particles are fixed in the glassy material.

Figure 5:
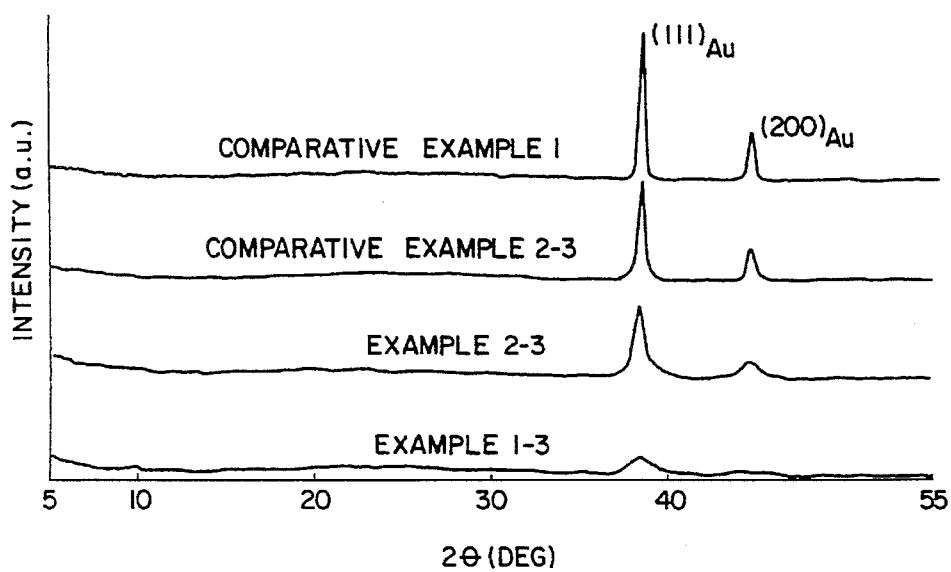
FIG. 5 shows x-ray diffraction patterns of samples made according to the EXAMPLES of the inventive material and COMPARATIVE EXAMPLES.

Further, FIG. 5, an x-ray diffraction pattern of the glassy material of EXAMPLE 1-3, has a broad diffraction peak for gold. This indicates that the size of the gold particles is small and that the gold is fixed with its form kept as ultrafine particles. In addition, no diffraction peak is found other than that of gold which indicates that the titanium oxide has a non-crystalline structure.

Figure 6:
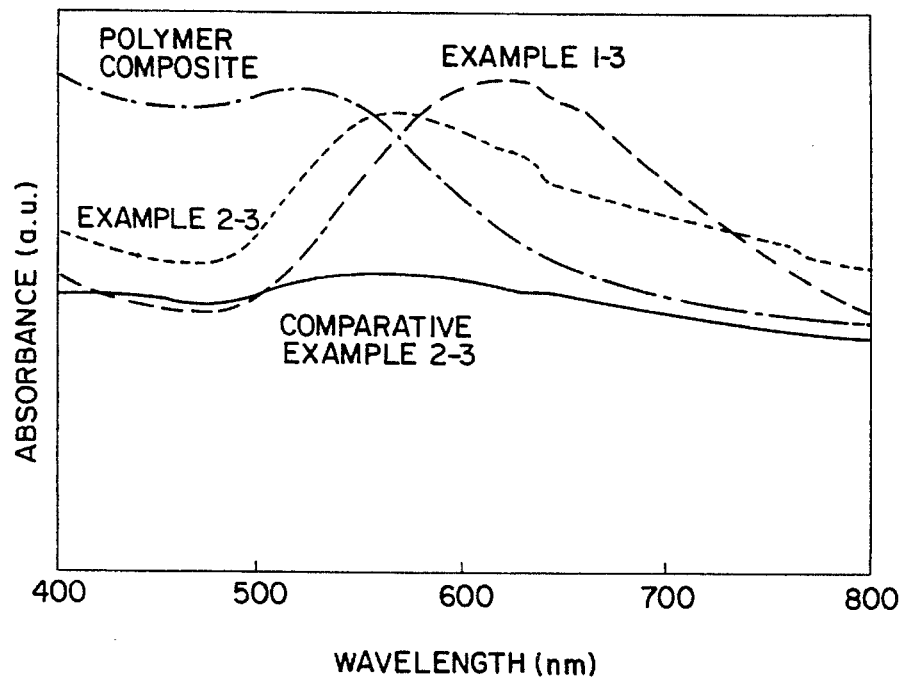
FIG. 6 shows light absorption spectra of samples made according to the EXAMPLES of the inventive material and COMPARATIVE EXAMPLES.

FIG. 6 is a light absorption spectrum of the glassy material of EXAMPLE 1-3 of TABLE 1. The absorption peak due to the polymer composite, which appears at about 530 nm, is attributed to the resonance absorption of surface plasmon which gives the polymer composite its red color of colloidal gold. However, in the glassy material of EXAMPLE 1-3, this absorption peak has shifted into a longer wavelength region near 620 nm. The shift suggests that the titanium oxide surrounding the gold particles interacted with surface plasmon of the gold to change the plasmon band of the gold.

FIG. 7 illustrates the electric properties, i.e., the I-V characteristics, of the glassy material of EXAMPLE 1-3. FIG. 7 indicates that the I-V characteristics are non-linear and the gold/titanium oxide has characteristics which permits electricity to pass through, with the ITO glass substrate being positive.

FIG. 8 illustrates the I-V characteristics and light-responding characteristics of the glassy material of EXAMPLE 1-3. The irradiation of light onto the ITO glass substrate side of the sample of EXAMPLE 1-3 immediately stopped the flow of current, that is, the gold/titanium oxide performed a switching function in response to light. In contrast, the sample in which the gold had grown in size to become large particles, i.e., COMPARATIVE EXAMPLE 2-3 of TABLE 5, had a linear I-V characteristic which did not change at all upon irradiation.

EXAMPLE 2

A polymer composite was prepared in accordance with the method of EXAMPLE 1 and mixed with aluminum oxine complex [Al(C$_9$H$_6$NO)$_3$] as the fixation reagent in m-cresol in the amounts indicated in TABLE 2 with adequate mixing. TABLE 2 gives the amount of polymer composite, on a weight percent solids basis, present with the balance being the aluminum oxine complex. The thus produced film-forming compositions were applied to soda-lime glass substrates, placed in a closed vessel with evacuation provided by a rotary pump and dried therein at a temperature of about 100° C. for a time period of about 10 minutes to remove the solvent. The resulting films on the substrates were then fired at a temperature of about 500° C. for a time period of about 10 minutes in an oven to decompose and remove the organic components and sinter the fixation reagent. The characteristics of the glassy materials that were produced are provided in TABLE 2.

TABLE 2

|  | Example 2 | | | |
| --- | --- | --- | --- | --- |
|  | 2-1 | 2-2 | 2-3 | 2-4 |
| polymer composite | | | | |
| average size of ultra-fine-particle (nm) | 5 | 5 | 5 | 5 |
| content of ultrafine-particle (wt %) | 15 | 15 | 15 | 15 |
| content of polymer composite (wt %) | 22.3 | 59.1 | 74.3 | 85.2 |
| color before fired | red | red | red | red |
| film after fired | | | | |
| color | red | red | red purple | red purple |
| content of Au (mol %) | 10 | 33 | 50 | 67 |
| particle size of Au (nm) | 11 | 19 | 13 | 21 |
| chemical state of Al | oxide (Al—O) | oxide (Al—O) | oxide (Al—O) | oxide (Al—O) |
| structure of Al—O | non-cystal | non-cystal | non-cystal | non-cystal |

As shown in FIG. 5, the x-ray diffraction pattern of the glassy material of EXAMPLE 2-3 has a broad diffraction peak for gold. This indicates that the size of the gold particles is small and that the gold is fixed while maintaining its form as ultrafine particles. Since them is no diffraction peak except for the gold, the aluminum oxide has a non-crystalline structure.

In FIG. 6, the light absorption spectrum of the glassy material of EXAMPLE 2-3 has a broad absorption peak that starts at about 530 nm. This broad peak suggests that the plasmon band of the gold was changed due to the aluminum oxide surrounding the gold particles interacting with the surface plasmon of the gold.

FIG. 9 illustrates the I-V characteristics and the light-responding characteristics of the glassy material of EXAMPLE 2-3. The flow of the current was interrupted in a moment upon irradiation of light to the glassy material from the ITO glass substrate side. Thus, the gold/aluminum oxide functioned as a switch in response to light.

TABLE 3 gives the peaks of fluorescent x-ray aluminumK β1 high resolution spectra of the glassy material of EXAMPLE 2-3 and of metal aluminum (0-valency) and Al$_2$O$_3$ (oxide, +3-valency) used as references. In TABLE 3, the main peak of the fluorescent x-ray aluminumKβ1 high resolution spectrum of aluminum contained in the gold/aluminum oxide of the glassy material coincides with the aluminum in the Al$_2$O$_3$. Satellite peaks due to the transformation of electrons from oxygen to aluminum are found at nearly the same positions. These results indicate that the aluminum contained in the gold/aluminum oxide is an oxide with a +3 valency.

TABLE 3

| sample | position of main peak X-ray energy (eV) | position of satellite peak X-ray energy (eV) |
| --- | --- | --- |
| comparative sample 1 Al (0–valency) | 1554.02 | — |
| comparative sample 2 Al$_2$O$_3$ (3–valency) | 1551.52 | 1536.58 |
| example 2-3 Au/ AlO$_M$ | 1551.21 | 1536.13 |

EXAMPLE 3

A polymer composite was produced in accordance with the method of EXAMPLE 1. The polymer composite and an fixation reagent specified in TABLE 4 were dissolved in m-cresol in the prescribed amounts with adequate mixing. TABLE 4 indicates the amount of polymer composite, on a weight percent solids basis, present with the balance being the fixation reagent. The resulting film-forming compositions were placed on soda-lime glass substrates that were placed in a closed vessel with evacuation provided by a rotary pump and dried therein at a temperature of about 100° C. for a time period of about 10 minutes to remove the solvent. The resulting films on the substrates were fired at a temperature of about 500° C. for a time period of about 10 minutes to decompose and remove the organic components and sinter the fixation reagent into glassy fixation components to produce the particle dispersed glassy materials. The characteristics of the particle dispersed glassy materials are provided in TABLE 4.

TABLE 4

|  | Example 3 | | | |
| --- | --- | --- | --- | --- |
|  | 3-1 | 3-2 | 3-3 | 3-4 |
| polymer composite | | | | |
| average size of ultrafine-particle (nm) | 5 | 5 | 5 | 5 |
| content of ultra-fine-particle (wt %) | 15 | 15 | 15 | 15 |
| fixation (M—R) | iron | copper | penta-n- | tetra-n- |

TABLE 4-continued

| | Example 3 | | | |
|---|---|---|---|---|
| | 3-1 | 3-2 | 3-3 | 3-4 |
| reagent | octanoate | octanoate | butoxy niobium | butoxy geranium |
| content of polymer composite (wt %) | 58.6 | 50.4 | 80.6 | 78.2 |
| color before fired | red | red | red | red |
| film after fired | | | | |
| color | light brown | red purple | light brown | bitter orange |
| content of Au (mol %) | 50 | 33 | 50 | 50 |
| particle size of Au (nm) | 9 | 49 | 10 | 20 |
| chemical state of M | oxide (Fe—O) | oxide (Cu—O) | oxide (Nb—O) | oxide (Ge—O) |
| structure of M—O | non-cystal | non-cystal | non-cystal | non-cystal |

COMPARATIVE EXAMPLE 1

A polymer composite was prepared in accordance with the method of EXAMPLE 1. The polymer composite was dissolved in m-creosol to produce a comparative composition that was applied to a soda-lime glass substrate. The composition on the substrate were placed in a closed vessel evacuated with a rotary, pump at a temperature of about 120° C. for a time period of about 10 minutes to remove the solvent. The sample was fired at a temperature of about 500° C. for a time period of about 10 minutes to decompose and remove the organic components and sinter the remaining materials and produce a comparative material. The properties of the comparative material are provided in TABLE 5.

TABLE 5

| | Comparative Example | | | |
|---|---|---|---|---|
| | 1 | 2-1 | 2-2 | 2-3 |
| polymer composite | | | | |
| average size of ultra-fine-particle (nm) | 5 | 5 | 5 | 5 |
| content of ultra-fine-particle (wt %) | 15 | 15 | 15 | 15 |
| comparative organometallic compound (M—R) | none | potassium octanoate | calcium octanoate | tetra-i-propoxy silane |
| content of polymer composite (wt %) | 100 | 77.1 | 62.1 | 83.9 |
| color before fired | red | red | red | red |
| film after fired | | | | |
| color | gold | gold | gold | gold |
| content of Au (mol %) | 100 | 50 | 50 | 50 |
| particle size of Au (nm) | more 100 | more 100 | more 100 | more 100 |
| chemical state of M | — | oxide (K—O) | oxide (Ca—O) | oxide (Si—O) |
| structure of M—O | — | non-cystal | non-cystal | non-cystal |

The results shown in TABLE 5 indicate that in the comparative material of COMPARATIVE EXAMPLE 1, the ultrafine gold particles aggregated to form large particles during the firing. Aggregation is indicated by a gold color of the comparative material.

As shown in FIG. 5, the x-ray diffraction pattern of the comparative material of COMPARATIVE EXAMPLE 1 has a sharp peak for gold which also indicates that the crystal grams have grown to a large size.

COMPARATIVE EXAMPLE 2

A polymer composite was prepared in accordance with the method disclosed in EXAMPLE 1. The polymer composite and a comparative organometallic compound (M—R), as specified in TABLE 5, were dissolved in m-creosol. TABLE 5 indicates the amount of polymer composite, on a weight percent solids basis, present with the balance being the comparative organometallic compound. The resulting comparative solutions were applied to soda-lime glass substrates and dried in a closed vessel being evacuated with a rotary pump at a temperature of 120° C. for a time period of 10 minutes to remove the solvent. The dried samples were fired at a temperature of about 500° C. for a time period of about 10 minutes to decompose and remove the organic components and sinter the remaining materials to form a comparative material. In COMPARATIVE EXAMPLE 2, an alkaline metal (potassium), an alkaline earth metal (calcium) and a non-metallic element (silicon) were used as the M group of the comparative organometallic compound. The characteristics of the comparative materials are provided in TABLE 5.

In COMPARATIVE EXAMPLE 2, the M component of the organometallic compounds did not interact with the ultrafine particles and therefore did not prevent aggregation of the particles. As can be seen in the x-rayed diffraction pattern of FIG. 5, the comparative material of COMPARATIVE EXAMPLE 2-3 has a sharp peak for gold which indicates the increase in particle size.

FIG. 6 shows a light absorption spectrum of the comparative material of COMPARATIVE EXAMPLE 2-3. The spectrum has neither a plasmon band nor any absorption peak in the visible light region.

FIG. 7 shows the I-V characteristics of the comparative material of COMPARATIVE EXAMPLE 2-3. The I-V characteristics are linear which indicates that the comparative material is ohmic.

EXAMPLE 4

A polymer composite was prepared in accordance with a process similar to that disclosed in EXAMPLE 1 but instead palladium chips were used in place of the gold chips of EXAMPLE 1. The polymer composite contained about 20 wt % solids of ultrafine palladium particles having an average particle size of about 2 nm.

The polymer composite and the fixation reagent tetra-i-propoxy titanium were dissolved in m-cresol in the amounts disclosed in TABLE 6. TABLE 6 discloses the amount of polymer composite, on a weight percent solids basis, present with the remainder being the fixation reagent. The resultant film-forming compositions were applied to soda-lime glass substrates and dried in a closed vessel evacuated with a rotary pump at a temperature of about 120° C. for a time period of about 10 minutes to remove the solvent. The films on the substrates were then fired at a temperature of about 500° C. for a time period of about 10 minutes to decompose and remove the organic component and sinter the remaining materials into glassy materials. The characteristics of the glassy materials are provided in TABLE 6.

TABLE 6

|  | Example 4 |
|---|---|
| polymer composite |  |
| kind of ultrafine-particle | Pd |
| average size of ultrafine-particle (nm) | 2 |
| content of ultrafine-particle (wt %) | 10 |
| fixation reagent (M—R) | tetra-i-propoxy titanium |
| content of polymer composite (wt %) | 82.6 |
| color before fired | mixture of red and yellow |
| firing condition 500° C., 10 min. atmosphere |  |
| film after fired |  |
| color | dark blue |

TABLE 6-continued

|  | Example 4 |
|---|---|
| chemical structure of ultrafine-particle | Pd |
| content (mol %) | 50 |
| particle size (nm) | 13 |
| chemical state of Ti | oxide Ti—O |
| structure of Ti—O | noncystal |

EXAMPLE 5

The polymer composite of EXAMPLE 1, one of the fixation reagents identified in TABLE 7 and skeleton forming reagent, i.e., tetra-i-propoxysilane [Si<i—OC$_3$H$_7$>$_4$] were dissolved in m-cresol with adequate mixing. The resultant film-forming compositions were applied to soda-lime glass substrates and dried in a closed vessel being evacuated with a rotary pump at a temperature of about 100° C. for a time period of about 10 minutes. The resulting films exhibited not only improved physical strength but also improved chemical durability. The resultant films on the substrates were fired in an oven at a temperature of about 500° C. for a time period of about 10 minutes to decompose and remove the organic components and sinter the remaining materials into particle dispersed glassy materials. The characteristics of the resultant glassy materials are provided in TABLE 7.

TABLE 7

|  | Example 5 | | | | | |
|---|---|---|---|---|---|---|
|  | 5-1 | 5-2 | 5-3 | 5-4 | 5-5 | 5-6 |
| polymer composite |  |  |  |  |  |  |
| average size of ultrafine-particle (nm) | 5 | 5 | 5 | 5 | 5 | 5 |
| content of ultrafine-particle (wt %) | 15 | 15 | 15 | 15 | 15 | 15 |
| fixation reagent (M—R) | tetra-i-propoxy titanium | tetra-i-propoxy titanium | tetra-i-propoxy titanium | aluminum oxine complex | aluminum oxine complex | aluminum oxine complex |
| skeleton forming reagent (M'—R) |  |  | tetra-i-propoxy silane |  |  |  |
| content (wt %) |  |  |  |  |  |  |
| polymer composite | 90.5 | 82.5 | 83.0 | 67.5 | 72.7 | 43.2 |
| fixation reagent | 2.6 | 4.8 | 2.4 | 11.7 | 12.8 | 30.6 |
| skeleton forming reagent | 6.9 | 12.7 | 14.6 | 20.8 | 14.5 | 26.2 |
| color before fired | red | red | red | red | red | red |
| film after fired |  |  |  |  |  |  |
| color | green blue | dark blue | dark blue | red purple | red purple | red |
| chemical structure of ultrafine-particle content (mol %) | Au | Au | Au | Au | Au | Au |
| Au/M—O/M'—O | 67/8/25 | 50/12/38 | 50/6/44 | 50/12/38 | 40/20/40 | 17/33/50 |
| particle size (nm) | 14 | 12 | 12 | 26 | 8 | 7 |
| chemical state of M | oxid Ti—O | oxid Ti—O | oxid Ti—O | oxid Al—O | oxid Al—O | oxid Al—O |
| structure of M | non-cystal | non-cysta | non-cystal | non-cystal | non-cysta | non-cystal |
| chemical state of M' | oxid Si—O | oxid Si—O | oxid Si—O | oxid Si—O | oxid Si—O | oxid Si—O |

Even when the amount of titanium oxide was as small as 6 mol % (EXAMPLE 5-3) and the aluminum oxide was as small as 12 mol % (EXAMPLE 5-4), a 3-component glassy material comprising gold/titanium oxide/silicon oxide and gold/aluminum oxide/silicon oxide, respectively, containing a high concentration of fixed ultrafine gold particles was produced.

EXAMPLE 6 and COMPARATIVE EXAMPLE 3

Five grams of nylon 11 pellets were placed on the tungsten board in a vacuum evaporator which was then evacuated to a reduced pressure of $1\times10^{-6}$ Torr. The voltage was applied to the tungsten board to heat the board and melt the nylon 11 while maintaining the vacuum. The nylon 11 was evaporated and deposited on a glass substrate set on the mount in the vacuum evacuator at a rate of about 1 μm/min at a reduced pressure of about $1\times10^{-4}$ to about $1\times10^{-4}$ Torr. The thickness of the deposit of nylon 11 layer was about 5 μm. The molecular weight of the deposited nylon 11 was about ½ to about ¹⁄₁₀th that of the nylon 11 of the original nylon 11 pellets.

Copper chips were placed and melted on the tungsten board and deposited on the nylon 11 layer at a reduced pressure of about $1\times10^{-4}$ to about $1\times10^{-6}$ Torr. The substrate having the unstable nylon 11 layer and copper layer were removed from the vacuum evaporator and placed for 10 minutes in a thermostatic chamber kept at 120° C. to stabilize the unstable polymer layer and produce the polymer composite. The polymer composite had about 60 wt % $Cu_2O$ ultrafine particles having particle sizes in the range of about 4 to about 8 nm.

The glassy materials of EXAMPLE 6 were produced using the polymer composite and the fixation reagent tetra-i-propoxy titanium in m-creosol. TABLE 8 indicates the amount of polymer composite, on a weight percent solids basis, present with the remainder being the fixation reagent.

TABLE 8

|  | Example 6 ||| Comparative Example 3 |||
| --- | --- | --- | --- | --- | --- | --- |
|  | 6-1 | 6-2 | 6-3 | 3-1 | 3-2 | 3-3 |
| polymer composite |  |  |  |  |  |  |
| average size of ultrafine-particle (nm) | 8 | 8 | 8 | 8 | 8 | 8 |
| content of ultrafine-particle (wt %) | 20 | 20 | 20 | 20 | 20 | 20 |
| fixation reagent or comparative organometallic compound | tetra-i-propoxy titanium ||| tetra-i-propoxy silane |||
| content of polymer composite (wt %) | 84.7 | 84.7 | 84.7 | 85.1 | 85.1 | 85.1 |
| condition of manufacture | 1 | 2 | 3 | 1 | 2 | 3 |
| film after fired |  |  |  |  |  |  |
| color | yellow red | green | brown | yellow | copper color | gray brown |
| chemical structure of Cu | $Cu_2O$ | Cu | CuO | $Cu_2O$ | Cu | CuO |
| content (mol %) | 66.6 | 80.0 | 80.0 | 66.6 | 80.0 | 80.0 |
| particle size (nm) | 11.5 | 18.4 | 20.6 | more 100 | more 100 | more 100 |
| chemical state of M | Ti—O | Ti—O | Ti—O | Si—O | Si—O | Si—O |
| secondary fired film |  |  |  |  |  |  |
| color |  | yellow red | yellow red |  |  |  |
| chemical structure of Cu |  | $Cu_2O$ | $Cu_2O$ |  |  |  |
| content (mol %) |  | 66.6 | 66.6 |  |  |  |
| particle size (nm) |  | 8.5 | 10.2 |  |  |  |
| chemical state of M |  | Ti—O | Ti—O |  |  |  |

The comparative materials of COMPARATIVE EXAMPLE 3 were produced using the polymer composite and the comparative organometallic compound tetra-i-propoxysilane in m-creosol. TABLE 8 indicates the amount of polymer composite, on a weight percent solids basis, present with the remainder being the comparative organometallic compound.

The glassy material of EXAMPLE 6 and the comparative material of COMPARATIVE EXAMPLE 3 were produced by dissolving the polymer composite and the fixation reagent or a comparative organometallic compound in m-creosol. The film-forming composition for EXAMPLE 6 and the comparative film-forming composition for COMPARATIVE EXAMPLE 3 were then applied to soda-lime glass substrates that were placed in a closed vessel evacuated with a rotary pump and dried to remove the solvent at a temperature of 120° C. for a time period of 10 minutes to produce three sets of dried film and comparative dried films.

The resulting dried films and comparative dried films were fired using the following three different firing methods. In the first method, firing was performed in nitrogen gas containing about 0.05 vol. % oxygen at a temperature of about 500° C. for a time period of about 20 minutes. In the second method, the films were first fired at a temperature of about 300° C. for a time period of about 20 minutes while being exposed to a reduced pressure of about $1\times10^{-5}$ Torr to fix the particles in the form of Cu in a glass matrix and to decompose and remove the organic components. The glass matrix having the Cu particles therein were subjected to heat treatment, i.e., a low temperature oxidizing treatment, in an oxidizing atmosphere at a temperature of about 150° C. for a time period of about 60 minutes to oxidize the Cu to $Cu_2O$.

In the third method, the film and comparative film were fired in air at a temperature of about 500° C. for a time period of about 20 minutes to fix the particles as CuO in a glass matrix and decompose and remove the organic components. Then, the glass matrix having particles therein were subjected to heat treatment at a temperature of about 150° C. for a time period of about 10 minutes in an atmosphere of nitrogen gas containing about 0.1 volume % hydrogen gas to reduce the CuO to $Cu_2O$. The properties of the glassy materials and the comparative materials are provided in TABLE 8.

Figure 10:
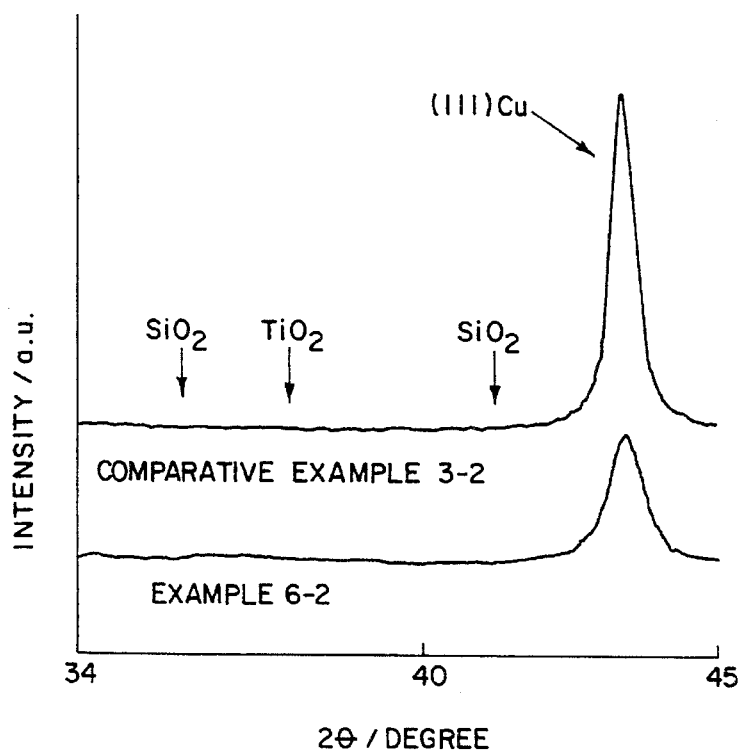
FIG. 10 shows x-ray diffraction patterns of the glassy material of EXAMPLE 6-2 and of the comparative material of COMPARATIVE EXAMPLE 3-2.

FIG. 10 shows x-ray diffraction patterns for the glassy material of EXAMPLE 6-2 and for the comparative material of COMPARATIVE EXAMPLE 3-2, respectively. In both diffraction patterns, diffraction peaks for Cu(111) are found which indicates that the $Cu_2O$ was reduced to Cu. However, for COMPARATIVE EXAMPLE 3-2 the peak of Cu(111) is sharp which indicates that the reduced copper had grown in particle size and could not be fixed in the comparative glass matrix as ultrafine particles. In contrast, the sample of EXAMPLE 6-2 has a broad Cu(111) peak which indicates that the copper was fixed during firing in the glass matrix without losing its ultrafine particle state.

The oxides of silicone and titanium of the glassy material and comparative material are non-crystalline oxides because there is no diffraction peak for these oxides in FIG. 10.

Figure 11:
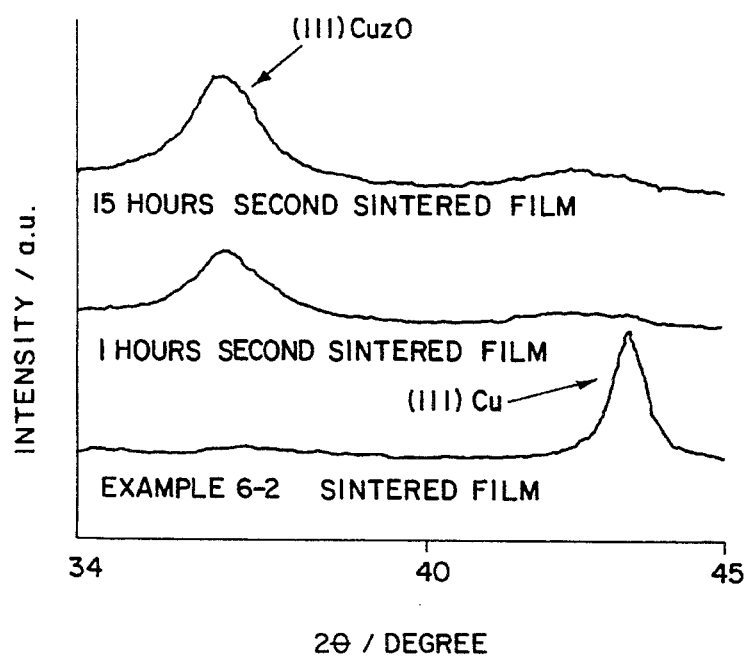
FIG. 11 shows x-ray diffraction patterns of the glassy material of EXAMPLE 6-2 before and after the low temperature oxidizing treatment.

FIG. 11 shows x-ray diffraction patterns for the fired film of EXAMPLE 6-2 before and after the low temperature oxidizing treatment. Prior to the oxidizing treatment, the copper was fixed in a glassy matrix as ultrafine particles. Even after being oxidized from copper to $Cu_2O$, the $Cu_2O$ was still present as ultrafine particles. Furthermore, even when the oxidizing treatment was increased to a time period of up to 15 hours, no change was observed in the x-ray diffraction pattern. This indicates that oxidation from $Cu_2O$ to CuO and aggregation of the ultrafine particles did not occur.

Figure 12:
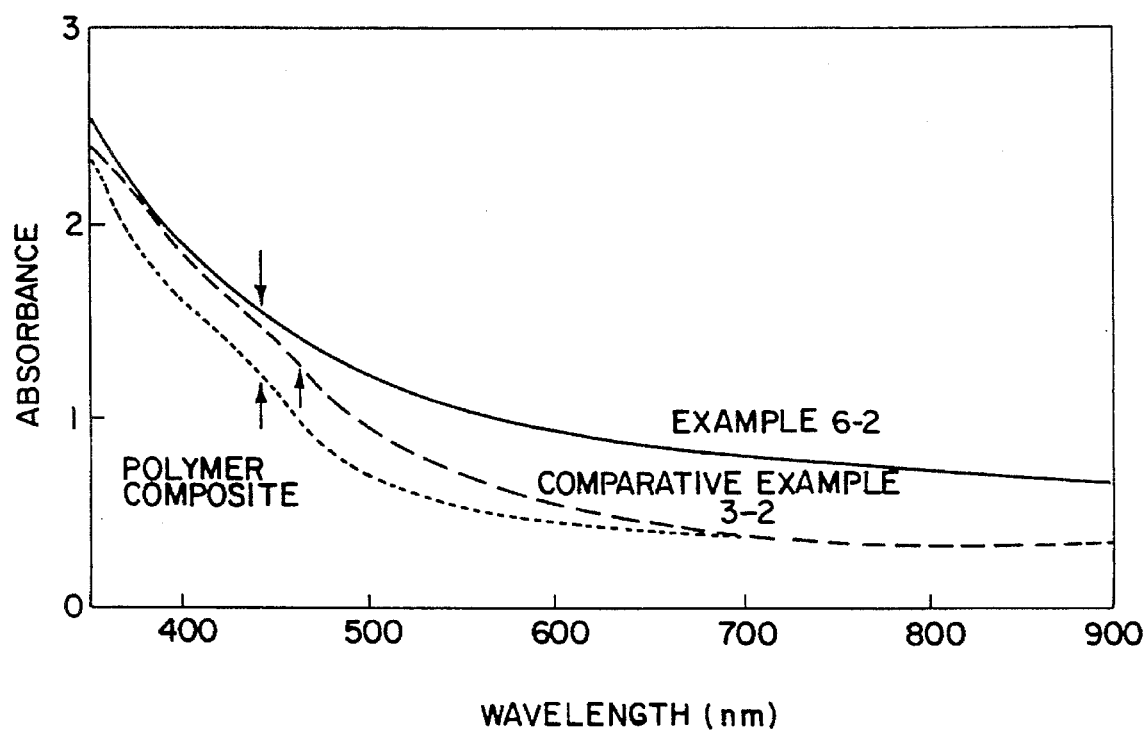
FIG. 12 shows light absorption spectra of the glassy material of EXAMPLE 6-2 and the comparative material of the COMPARATIVE EXAMPLE 3-2.

FIG. 12 shows a visible light absorption spectra for the glassy material of EXAMPLE 6-2 and for the comparative material of COMPARATIVE EXAMPLE 3-2, respectively. In the spectrum of the comparative material of COMPARATIVE EXAMPLE 3-2, the curve begins to rise at a point near 600 nm situated in the longer wavelength side for that of the polymer composite and the shoulder shown by the arrow has also shifted to the longer wavelength side. These factors indicate that the $Cu_2O$ grew in particle size. This spectrum for the comparative material resembles the absorption spectrum of a bulk $Cu_2O$ thin film.

In contrast, in the spectrum of the glassy material of EXAMPLE 6-2 in which the ultrafine particles of $Cu_2O$ are fixed in the glass matrix, the position of the shoulder as shown by the arrow has not changed from that of the polymer composite and the absorbance in the longer wavelength side for the shoulder lowers. These factors indicate that redness increases as the absorbance in the longer wavelength side decreases and that the color change is attributable to the interaction between the fine $Cu_2O$ particles and the oxides surrounding the particles.

EXAMPLE 7

The polymer composite and the second firing method of EXAMPLE 6 were used to prepare glassy materials. The amount of polymer composite, on a weight percent solids basis, is provided in TABLE 9 with the fixation reagent being present in an amount to obtain a solids content of 100 wt % solids. The characteristics of the resultant glassy materials are provided in TABLE 9. The glassy material of this example had free particles of $Cu_2O$ fixed in a glassy matrix at a high concentration.

TABLE 9

| | Example 7 | | |
|---|---|---|---|
| | 7-1 | 7-2 | 7-3 |
| polymer composite | | | |
| average size of ultrafine-particle (nm) | 8 | 8 | 8 |
| content of ultrafine-particle (wt %) | 20 | 20 | 20 |
| fixation reagent | tetra-i-propoxy titanium | | |
| content of polymer composite | 58.0 | 84.7 | 91.7 |
| condition of manufacture | 2 | 2 | 2 |
| film after fired | | | |
| color | green | green | green |
| chemical structure of Cu | Cu | Cu | Cu |
| content (mol %) | 50.0 | 66.6 | 88.9 |
| particle size (nm) | 15.8 | 18.0 | 20.4 |
| secondary fired film | | | |
| color | yellow red | yellow red | yellow red |
| chemical structure of Cu | $Cu_2O$ | $Cu_2O$ | $Cu_2O$ |
| content (mol %) | 33.0 | 50.0 | 80.0 |
| particle size (nm) | 8.0 | 8.5 | 11.1 |
| chemical state of M | Ti—O | Ti—O | Ti—O |

EXAMPLE 8 AND COMPARATIVE EXAMPLE 4

Five grams of nylon 11 polymer pellets were placed on a tungsten board in a vacuum evaporator which was then evacuated to a reduced pressure of about $1\times10^{-6}$ Torr. A voltage was applied to the tungsten board to melt and evaporate the nylon while maintaining the vacuum. The nylon was deposited on a glass substrate mounted in the vacuum evaporator at a rate of about 1 μm/min at a reduced pressure of about $1\times10^{-4}$ to about $1\times10^{-6}$ Torr. The thickness of the nylon layer was about 5 μm. The molecular weight of the nylon in the deposited nylon layer was about ½ to about ¹/10th that of the nylon of the original pellets.

Copper chips were placed on the tungsten board, melted and then vapor deposited at a reduced pressure of about $1\times10^{-4}$ to about $1\times10^{-6}$ Torr to form a copper layer on the nylon layer. The nylon layer having the copper film thereon was placed in a thermostatic chamber kept at 120° C. for a time period of about 10 minutes to produce the polymer composite. The polymer composite had about 20 wt % copper as fine particles having an average particle size of about 4 to 8 nm.

Glassy materials of EXAMPLE 8 were produced by dissolving the polymer composite and a fixation reagent indicated in TABLE 10, i.e., tetra-i-propoxy titanium [Ti(i—$OC_3H_7)_3$] and AMD [Al(i-propoxy)$_2$(sec-butoxy)]. TABLE 10 indicates the amount of polymer composite, on a weight percent solids basis, present with the balance being the fixation reagent. The comparative materials were prepared using the polymer composite and tetra-i-propoxysilane in the amounts indicated in TABLE 10. The polymer composite and the fixation reagent were dissolved in m-creosol to produce the film-forming compositions and comparative compositions. The film-forming compositions and comparative compositions were applied to soda-lime glass substrates and placed in closed vessel under evacuation with a rotary pump at a temperature of 120° C. for a time period of about 10 minutes to remove the solvent. The resulting films and comparative films were fired under firing conditions No. 1, i.e., firing at a temperature of about 350° C. at a reduced pressure of $1\times10^{-3}$ Torr, or No. 2, i.e., firing at a temperature of about 200° C. in ambient atmosphere, i.e., air. The secondary treatment conditions were either No. 1', i.e., firing at 500° C. in ambient atmosphere, and No. 2', i.e., firing at a temperature of about 200° C. in a nitrogen atmosphere including 0.01 vol % hydrogen. The characteristics of the glassy materials and the comparative materials are provided in TABLE 10.

ultrafine tin particles having an average particle size of about 22 nm. The cobalt-containing polymer composite had a content of about 10 wt % of ultrafine particles of CoO having an average particle size of about 6 nm.

To produce the glassy materials of EXAMPLE 9, the fixation reagent with which the polymer composite was dissolved was either tetra-i-propoxy titanium or AMD, i.e., Al(i-propoxy)$_2$(sec-butoxy). To produce the comparative materials of COMPARATIVE EXAMPLE 5, the compara-

TABLE 10

|  | Example 8 | | | | Comparative Exam 4 | |
| --- | --- | --- | --- | --- | --- | --- |
|  | 8-1 | 8-2 | 8-3 | 8-4 | 4-1 | 4-2 |
| polymer composite | | | | | | |
| average size of ultrafine-particle (nm) | 8 | 8 | 8 | 8 | 8 | 8 |
| content of ultrafine-particle (wt %) | 20 | 20 | 20 | 20 | 20 | 20 |
| fixation reagent or comparative organometallic compound | tetra-i-propoxy titanium | tetra-i-propoxy titanium | AMD *1 | AMD *1 | tetra-i-propoxy silane | tetra-i-propoxy silane |
| content of polymer composite (wt %) | 84.7 | 84.7 | 84.7 | 87.6 | 85.1 | 85.1 |
| condition of manufacture | 1 | 2 | 1 | 2 | 1 | 2 |
| film after fired | | | | | | |
| color | green | yellow brown | green | yellow brown | copper color | gray brown |
| chemical structure of Cu | Cu | CuO | Cu | CuO | Cu | CuO |
| content (mol %) | 80.0 | 80.0 | 80.0 | 80.0 | 80.0 | 80.0 |
| particle size (nm) | 18.4 | 19.9 | 24.2 | 29.5 | 100< | 100< |
| chemical state of M | Ti—O | Ti—O | Al—O | Al—O | Si—O | Si—O |
| secondary treatment condition | 1' | 2' | 1' | 2' | 1' | 2' |
| secondary fired film | | | | | | |
| color | yellow brown | green | yellow brown | green | gray brown | copper color |
| chemical structure of Cu | CuO | Cu | CuO | Cu | CuO | Cu |
| content (mol %) | 80.0 | 80.0 | 80.0 | 80.0 | 80.0 | 80.0 |
| particle size (nm) | 22.5 | 19.5 | 26.0 | 30.2 | 100< | 100< |
| chemical state of M | Ti—O | Ti—O | Al—O | Al—O | Si—O | Si—O |

*1 Al(i-propoxy)$_2$(sec-butoxy)

TABLE 10 indicates that for the glassy materials of EXAMPLES 10-1 to 10-4, the ultrafine particles of CuO or Cu contained in the glassy material are fixed in the glass matrix of titanium oxide or aluminum oxide and are still ultrafine particles, although they are slightly larger than the ultrafine particles of the polymer composite.

EXAMPLE 9 AND COMPARATIVE EXAMPLE 5

Polymer composites including nylon 11 as the polymer having ultrafine particles of tin and CoO were prepared by the method described in EXAMPLE 9 except that tin or cobalt chips were used instead of the copper chips. The tin-containing polymer composite included about 25 wt % of tive organometallic compound with which the polymer composite was dissolved was tetra-i-propoxysilane. The amount of polymer composite for the glassy materials of EXAMPLE 9 and the comparative materials of COMPARATIVE EXAMPLE 5, on a weight percent solids basis, are provided in TABLE 11. The polymer composites and the fixation reagents or the comparative organometallic compounds were dissolved in m-creosol to produce film-forming compositions or comparative compositions. The film-forming compositions and the comparative compositions were applied to soda-lime glass substrates and dried in a closed vessel evacuated with a rotary pump at a temperature of 120° C. for a time period of 10 minutes to remove the solvent and produce the films and comparative films.

TABLE 11

|  | Example 9 | | | | Comparative Exam. 5 | |
| --- | --- | --- | --- | --- | --- | --- |
|  | 9-1 | 9-2 | 9-3 | 9-4 | 5-1 | 5-2 |
| polymer composite | | | | | | |
| kind of ultrafine-particle | Sn | Sn | CoO | CoO | Sn | CoO |
| average size of ultrafine-particle (nm) | 22 | 22 | 6 | 6 | 22 | 6 |
| content of ultrafine-particle (wt %) | 25 | 25 | 10 | 10 | 25 | 10 |
| fixation reagent or comparative organometallic compound | tetra-i-propoxy titanium | AMD *1 | tetra-i-propoxy titanium | AMD *1 | tetra-i-propoxy silane | tetra-i-propoxy silane |
| content of polymer composite (wt %) | 87.0 | 90.4 | 91.3 | 93.7 | 88.4 | 92.3 |
| condition of manufacture | 2 | 2 | 2 | 2 | 2 | 2 |

TABLE 11-continued

|  | Example 9 | | | | Comparative Exam. 5 | |
| --- | --- | --- | --- | --- | --- | --- |
|  | 9-1 | 9-2 | 9-3 | 9-4 | 5-1 | 5-2 |
| film after fired |  |  |  |  |  |  |
| color | yellow white | yellow white | yellow gray | yellow gray | white | gray |
| chemical structure of ultrafine-particle | $SnO_2$ | $SnO_2$ | $Co_3O_4$ | $Co_3O_4$ | $SnO_2$ | $Co_3O_4$ |
| content (mol %) | 80.0 | 80.0 | 57.1 | 57.1 | 80.0 | 57.1 |
| particle size (nm) | 7.0 | 14.0 | 27.2 | 44.0 | 100< | 100< |
| chemical state of M | Ti—O | Al—O | Ti—O | Al—O | Si—O | Si—O |
| secondary treatment condition | 2' | 2' | 2' | 2' | 2' | 2' |
| secondary fired film |  |  |  |  |  |  |
| color | yellow brown | yellow brown | yellow | yellow | silver color | silver color |
| chemical structure of ultrafine-particle | Sn | Sn | Co | Co | Sn | Co |
| content (mol %) | 80.0 | 80.0 | 80.0 | 80.0 | 80.0 | 80.0 |
| particle size (nm) | 23.2 | 26.7 | 26.0 | 30.2 | 100< | 100< |
| chemical state of M | Ti—O | Al—O | Ti—O | Al—O | Si—O | Si—O |

*1 Al(i-propoxy)$_2$(sec-butoxy)

Each of the films and comparative films were fired to produce the glassy materials or comparative materials having the characteristics shown in TABLE 11 by combining the firing conditions No. 1 or No. 2 with the secondary treatment conditions No. 1' or No. 2', which are described in EXAMPLE 8.

The results indicate that the ultrafine particles of $SnO_2$ or $Co_3O_4$ in the glassy materials of EXAMPLE 9 have about the same size as the particles in the polymer composite, are fixed in the glass matrix of titanium oxide or aluminum oxide and maintain their ultrafine particle size. In contrast, the comparative materials of COMPARATIVE EXAMPLE 5 has large particles produced by aggregation of the ultrafine particles.

EXAMPLE 10

The polymer composite and the fixation reagent of EXAMPLE 8 was mixed with tetra-i-propoxysilane as a skeleton forming reagent. Dissolving these in m-creosol produced film-forming compositions that were applied to soda-lime glass substrates which were dried by being placed in a closed vessel evacuated with a rotary pump at a temperature of about 120° C. for a time period of about 10 minutes to remove the solvent. The films were fired to produce glassy materials under the firing conditions No. 1 or No. 2 followed by the secondary treatment condition No. 1' or No. 2' disclosed in EXAMPLE 8. TABLE 12 shows the characteristics of the glassy materials of EXAMPLE 10. As shown in TABLE 12, using the skeleton forming reagent produces a glassy skeleton forming component which further improves the physical and chemical durability of the glassy materials.

TABLE 12

|  | Example 10 | | | |
| --- | --- | --- | --- | --- |
|  | 10-1 | 10-2 | 10-3 | 10-4 |
| polymer composite |  |  |  |  |
| kind of ultrafine-particle | $Cu_2O$ | $Cu_2O$ | Sn | Sn |
| average size of ultrafine-particle (nm) | 8 | 8 | 22 | 22 |
| content of ultrafine-particle (wt %) | 20 | 20 | 25 | 25 |
| fixation reagent (A) | tetra-i-propoxy | AMD *1 | tetra-i-propoxy | AMD *1 |
| skeleton forming reagent |  | tetra-i-propoxy silane |  |  |
| content of polymer composite (wt %) | 84.7 | 87.6 | 87.0 | 90.4 |
| A/B (mol ratio) | 2/1 | 2/1 | 2/1 | 2/1 |
| condition of manufacture | 2 | 2 | 2 | 2 |
| film after fired |  |  |  |  |
| color | yellow brown | yellow brown | yellow white | yellow white |
| chemical structure of ultrafine-particle | CuO | CuO | $SnO_2$ | $SnO_2$ |
| content (mol %) | 80.0 | 80.0 | 80.0 | 80.0 |
| particle size (nm) | 19.4 | 24.9 | 11.5 | 12.2 |
| chemical state of M | Ti—O | Al—O | Ti—O | Al—O |
| chemical state of M' | Si—O | Si—O | Si—O | Si—O |
| secondary treatment condition | 2' | 2' | 2' | 2' |
| fired film |  |  |  |  |
| color | green | green | green brown | greenw brown |
| chemical structure of ultrafine-particle | Cu | Cu | Sn | Sn |
| content (mol %) | 80.0 | 80.0 | 80.0 | 80.0 |
| particle size (nm) | 17.8 | 19.5 | 20.0 | 21.1 |
| chemical state of M | Ti—O | Al—O | Ti—O | Al—O |
| chemical state of M' | Si—O | Si—O | Si—O | Si—O |

*1 Al(i-propoxy)$_2$(sec-butoxy)

It is presently theorized that the above-described advantages are achieved because the glassy material contains metal particles having an ultrafine particle size and a high-concentration of particles. These factors contribute to the glassy material exhibiting a large third order of non-linear susceptibility that makes them particularly well suited for applications that can take advantage of this large third order non-linear susceptibility. Such applications include optical and electronic components including optical devices such as wavelength transfer filters from infrared to visible light, photoresponsible material such as optical switching devices which act by absorbing a selected wavelength of light, color glasses and color producing agents for glass. The particles and the fixation component interact which prevents the particles from aggregating and permits them to be fixed in the glassy material without increasing their size. The interaction also inhibits the fixation component from crystallizing. It is also theorized that the methods used to produce the glassy material contribute to obtaining the advantages.

This invention has been described in terms of specific embodiments set forth in detail. It should be understood, however, that these embodiments are presented by way of illustration only, and that the invention is not necessarily limited thereto. Modifications and variations within the spirit and scope of the claims that follow will be readily apparent from this disclosure, as those skilled in the art will appreciate.

We claim:

1. A method of producing an ultrafine particle dispersed glassy material, the method comprising the steps of:
   (a) dissolving a polymer composite and an organometallic fixation reagent in an organic solvent to produce a film-forming composition, the polymer composite comprising a polymer having ultrafine particles dispersed therein, the particles being selected from the group consisting of:
      (i) a noble metal selected from the group consisting of gold, platinum, palladium, rhodium and silver;
      (ii) $Cu_2O$;
      (iii) metals selected from the group consisting of titanium, vanadium, chromium, manganese, iron, nickel, copper, zinc, cadmium, yttrium, tungsten, tin, germanium, indium and gallium; and
      (iv) oxides of the metals disclosed in (iii);
   (b) applying the film-forming composition to a surface of a substrate;
   (c) drying the applied composition to produce a film; and
   (d) firing the film to produce a glassy material.

2. The method of claim 1 wherein the step of firing the film occurs at a temperature between about 300°–800° C. for a time period sufficient to produce a glassy oxide around the dispersed ultrafine particles.

3. The method of claim 1 wherein the fixation reagent is selected from the group consisting of metallic acid esters, organic metal complexes and organic acid metallic salts.

4. The method of claim 1 wherein the polymer composite is produced by the steps of:
   forming a thermodynamically unstable polymer layer having a surface;
   depositing a metal selected from the group of (i), (ii) and (iii) on the surface of the unstable polymer layer; and then
   stabilizing the unstable polymer layer.

5. The method of claim 1 wherein the step of firing the film occurs at a temperature not less than about 300° C. in an atmosphere including an inert gas and oxygen.

6. The method in accordance with claim 5 wherein the atmosphere contains less than about 1.0 volume percent oxygen and wherein the method further comprises the step of heat treating the fired film in an oxidizing atmosphere.

7. The method in accordance with claim 5 wherein the atmosphere includes at least about 1 volume percent oxygen and wherein the method further includes the step of heat treating in a mixed gas including an inert gas and a reducing gas.

* * * * *